(12) United States Patent
George et al.

(10) Patent No.: US 6,621,240 B2
(45) Date of Patent: Sep. 16, 2003

(54) CENTERING CIRCUIT

(75) Inventors: John Barrett George, Carmel, IN (US); William Benjamin Aaron, Greenwood, IN (US)

(73) Assignee: Thomson Licensing S.A., Cedex (FR)

( * ) Notice: Subject to any disclaimer, the term of this patent is extended or adjusted under 35 U.S.C. 154(b) by 0 days.

(21) Appl. No.: 10/080,880

(22) Filed: Feb. 22, 2002

(65) Prior Publication Data

US 2002/0140384 A1 Oct. 3, 2002

Related U.S. Application Data

(60) Provisional application No. 60/279,955, filed on Mar. 29, 2001.

(51) Int. Cl.$^7$ .................................................. G09G 1/04
(52) U.S. Cl. ........................................ 315/399; 315/398
(58) Field of Search ........................ 315/398, 399, 315/370, 371, 408; 348/746, 747, 806

(56) References Cited

U.S. PATENT DOCUMENTS

| | | | | |
|---|---|---|---|---|
| 4,032,819 A | * | 6/1977 | Henley et al. | ............... 315/398 |
| 4,675,581 A | | 6/1987 | Dietz | ........................ 315/398 |
| 5,243,263 A | * | 9/1993 | Koblitz et al. | ............... 315/398 |
| 5,587,631 A | * | 12/1996 | Wilber et al. | ................ 315/403 |
| 5,661,375 A | * | 8/1997 | Haferl | ......................... 315/307 |
| 5,798,621 A | * | 8/1998 | Truskalo et al. | ............ 315/371 |

FOREIGN PATENT DOCUMENTS

| | | | |
|---|---|---|---|
| DE | 3924026 | * | 1/1990 |
| EP | 0987881 | * | 3/2000 |
| GB | 2 104 353 | | 3/1983 |
| JP | 55-150668 | | 11/1980 |
| JP | 9-149282 | * | 6/1997 |

* cited by examiner

*Primary Examiner*—Don Wong
*Assistant Examiner*—Ephrem Alemu
(74) *Attorney, Agent, or Firm*—Joseph S. Tripoli; Harvey D. Fried; Sammy S. Henig

(57) ABSTRACT

A horizontal deflection winding centering circuit includes a Darlington transistor and a diode. The Darlington transistor and diode form a non-linear network that is coupled in series with an inductor. The series arrangement of inductor and non-linear network is coupled in parallel with a horizontal deflection winding. The base voltage of the Darlington transistor is produced by a voltage divider coupled in a current path of the inductor current.

10 Claims, 1 Drawing Sheet

CENTERING CIRCUIT

CROSS REFERENCE TO RELATED APPLICATIONS

This is a non-provisional application which claims the benefit of provisional application serial number 60/279,955, filed Mar. 29, 2001.

BACKGROUND OF THE INVENTION

The invention relates to a raster positioning circuit such as, for example, a centering circuit for a deflection system of a display.

Deflection systems utilized in television receivers or monitors frequently include circuitry which allows for the adjustment of, for example, the centering of the raster on the face of the kinescope tube. The need for this centering feature is increased as overscan of the kinescope tube is reduced, that is, as the raster width approaches the width of the kinescope tube face. Centering is usually accomplished by causing a direct current of selected polarity and magnitude to flow through the deflection windings.

In some prior art arrangements, a centering circuitry is placed in parallel with the deflection windings to produce an average, or direct current (DC) through the deflection winding during the trace interval. It includes a non-symmetrical conduction network. An integrating inductor is coupled in series combination with the network for producing a magnitude imbalance between a positive portion of the inductor current and a negative portion of the inductor current in a manner to provide for a DC current component. The DC current component provides raster centering. The DC current component is adjustable by a potentiometer that conducts a significant portion of the inductance current.

Because peak values of the inductance current can reach several hundreds of milliamperes, the variable resistor tends to be expensive because it must be large to handle power and heat. It may be desirable to subject the variable resistor to a lower current peak level so that a less expensive part for the variable resistor can be utilized.

In carrying out an inventive feature, a centering circuit includes a Darlington transistor coupled in an anti-parallel arrangement with a single anti-parallel diode. The combination of the Darlington transistor and the single anti-parallel diode in a single case or package is common. The Darlington transistor and anti-parallel diode form a non-linear conduction network that is coupled in series with an inductor. The base voltage of the Darlington transistor is produced in a potentiometer forming a voltage divider. Because of the low base current of the Darlington transistor, the potentiometer conducts smaller current levels than the potentiometer in the prior art. Thereby, advantageously, a less expensive potentiometer can be utilized.

It may be desirable to be able to adjust the DC current component of the inductance current to a low level that may be close to zero. That requires adjusting the potentiometer to produce a collector-to-emitter voltage of the Darlington transistor to a minimum value that is approximately equal to the forward voltage of the single anti-parallel diode.

In carrying out another inventive feature, a resistor is coupled between the collector of the Darlington transistor and an end terminal of the potentiometer that is closer to the collector than to the emitter of the Darlington transistor. Thus, during Darlington transistor conduction, the resistor can provide extra turn on bias voltage and can reduce the collector-to-emitter voltage of the Darlington transistor to a level that is approximately equal to the forward voltage of the single anti-parallel diode.

SUMMARY OF THE INVENTION

A deflection apparatus with a raster positioning arrangement, embodying an inventive feature, includes an inductance coupled to the deflection winding for generating an alternating current in the inductance at a frequency related to a frequency of a deflection current. A rectifier is coupled to the inductance for conducting at least a portion of the inductance current, when the inductance current is at a first polarity. A first transistor is coupled to a switching, second transistor in a Darlington configuration. The second transistor is coupled to the inductance for conducting at least a portion of the inductance current, when the inductance current is at an opposite polarity.

BRIEF DESCRIPTION OF THE DRAWINGS

The sole FIGURE illustrates a horizontal deflection circuit that includes a centering circuit, embodying an inventive feature.

DESCRIPTION OF THE REFERRED EMBODIMENTS

Figure 1:
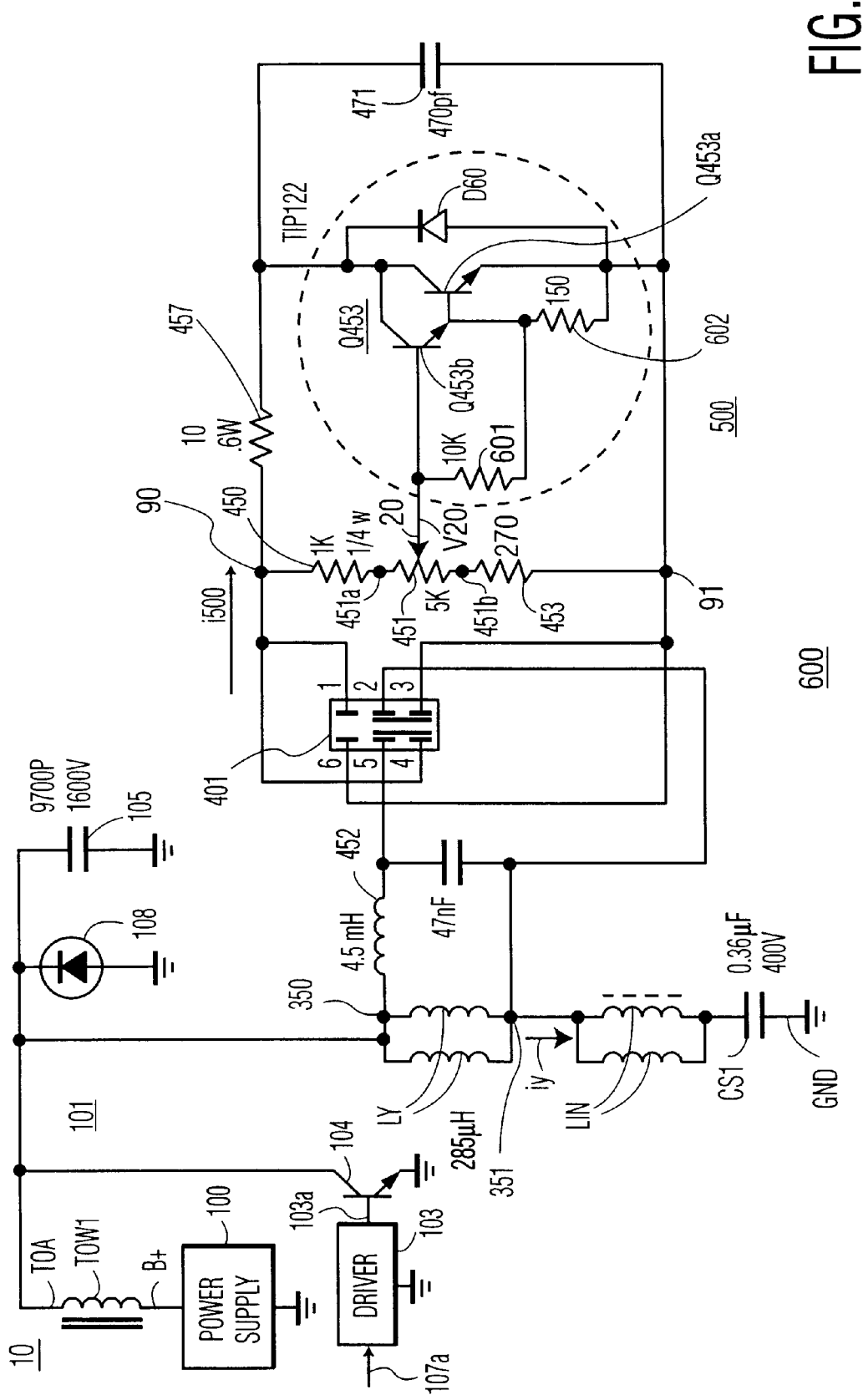

The sole FIGURE illustrates a conventional horizontal deflection circuit output stage 101 of a television receiver. Stage 101 is energized by a regulated power supply 100 that generates a supply voltage B+. A driver stage 103 is responsive to an input signal 107a at a horizontal deflection rate or frequency $f_H$, for example, 15.625 Hz.

Driver stage 103 generates a drive control signal 103a to control the switching operation in a switching transistor 104 of output stage 101. The collector of transistor 104 is coupled to a terminal T0A of a primary winding T0W1 of a flyback transformer T0. The collector of transistor 104 is also coupled to a retrace capacitor 105. The collector of transistor 104 is additionally coupled to a horizontal deflection winding LY to form a retrace resonant circuit. The collector of transistor 104 is also coupled to a damper diode 108. Winding LY is coupled in series with a linearity inductor LIN and a trace or S-capacitor CS1. Capacitor CS1 is coupled between a terminal 25 and a reference potential, or ground GND such that terminal 25 is interposed between inductor LIN and S-capacitor CS1. Output stage 101 is capable of producing a deflection current iy, in a well known manner.

A centering circuit 600 includes an inductor 452 coupled to a non-linear network 500, embodying an inventive feature, via a switch 401. Inductor 452 and non-linear network 500 form a series arrangement that is coupled between a terminal 350 and a terminal 351 of winding LY. Non-linear network 500 includes, between a terminal 90 and a terminal 91, a resistor 457 coupled in series with a parallel arrangement of a main current conducting transistor Q453a of a Darlington transistor Q453 and a single reverse shunting or anti-parallel diode D60. A biasing resistor 601 is coupled between the base and emitter of a transistor Q453b having an emitter that drives the base of transistor Q453a. A biasing resistor 602 is coupled between the base and emitter of transistor Q453a.

A deflection rate voltage is developed between terminals 350 and 351 to produce an alternating current (AC) current i500 in non-linear network 500. The circuit operates by pulse-width modulating a portion of current i500 flowing in transistor Q453a, when current i500 flows in a direction shown by the arrow. When current iSO flows in a direction opposite to that shown by the arrow, transistor Q453a is turned off and, instead, a corresponding portion of current i500 flows in diode D60.

A potentiometer or an adjustable resistor 451 is coupled in series with a fixed resistor 453 and a fixed resistor 450 to form a circuit branch that is coupled between terminal 90 and terminal 91. A direct current (DC) signal path that includes inductor 452 and resistors 450 and 451 and transistor 453b is formed between the base of transistor Q453a and deflection winding LY. An adjustable wiper 20 of resistor 451 is coupled to the base of transistor Q453b. The base-emitter voltage of transistor Q453b is produced from a relatively small portion of current i500 in inductor 452.

A control voltage V20 developed at adjustable wiper 20 of resistor 451 has sufficient range to turn off completely transistor Q453a, when the position of wiper 20 is closer to terminal 91. Similarly, control voltage V20 turns transistor Q453a on completely, when the position of wiper 20 is closer to terminal 90.

The length of a conduction interval of transistor Q453 or the pulse width of the collector current in transistor Q453a is determined by the amplitude of the voltage difference between the collector and emitter of transistor Q453a divided by the voltage divider potentiometer 451. It is also determined by the approximately 1.1 volts of base emitter bias required to turn on transistors Q453b and Q453a. amplitude of the voltage difference between the base and emitter voltage of transistor Q453a. Thus, the pulse width of the collector current in transistor Q453a is selectively adjusted by selectively adjusting the position of adjustable wiper 20.

Advantageously, Darlington transistor Q453 operates in a switch mode for reducing power dissipation. Because Darlington transistor Q453 operates in switch mode with a relatively low voltage drop when conductive, advantageously, no heat sink is needed.

A magnitude of a DC current component in current i500 of inductor 452 or of current iy in deflection winding LY is adjustable by varying the position of wiper 20 of resistor 451. A difference of the average currents in diode 60 and transistor Q453a provides a needed DC offset in current i500 of inductor 452 for controlling picture centering.

Switch 401 is of the double pole, double throw, type. Switch 401 operates in a non-shorting mode referred to as break contact before make contact. Switch 401 facilitates current polarity reversal selection. At one of its two positions, switch 401 has its terminal 1 selectively coupled to terminal 2 and terminal 5 coupled to terminal 6. At the other one of its positions, switch 401 has its terminal 3 selectively coupled to terminal 2 and terminal 5 coupled to terminal 4.

It can be desirable to have the capability of adjusting the average value inductance current i500 down to a low level or close to zero so as to prevent the occurrence of a so-called gap in the adjustment range. That requires having a minimum value of a collector-to-emitter voltage of Darlington transistor Q453a approximately equal to the forward voltage of single anti-parallel diode D60. The so-called gap would have been, otherwise, formed in the center of the centering control range when polarity reversing switch 401 is switched.

In carrying out another inventive feature, resistor 457 is coupled between the collector of Darlington transistor Q453a and junction terminal 90 or in series with Darlington transistor Q453a. At the low end of the adjustment range, corresponding to minimum DC current in winding LY and minimum centering offset, the position of wiper 20 is adjusted to a position closest to terminal 90 or to an end terminal 451a of potentiometer resistor 451. Thereby, a maximum collector current in transistor Q453a and a minimum collector-to-emitter voltage of transistor Q453a are produced.

During conduction of transistor Q453a the voltage drop across resistor Resistor 457 provides extra bias to the base of transistor 453b which allows of reducing the base-collector-emitter voltage of transistor Q453b Q453a to attain a magnitude that is close to zero. Thereby, the collector-to-emitter voltage of Darlington transistor Q453a is reduced to a level that is approximately equal to the forward voltage of single anti-parallel diode D60 of nearly 0.8V. Thus, a total current in Darlington transistor Q453 can be adjustable to become equal to the current in shunt diode D60 that flows in the opposite direction. Consequently, the average value of inductance current i500 can be adjusted, at the low end, to attain a level that is approximately zero. In this way, the aforementioned gap is advantageously avoided.

For explanation purposes, assume, hypothetically, that resistor 457 were replaced, instead, by an ideal, zero resistance conductor, not shown. In this case, the voltage between the collector and the emitter of transistor Q453a could not become lower than the base turn on voltage of transistor Q453b which is about 1.1V. Therefore, disadvantageously, the aforementioned gap would have been formed.

Resistor 457 also limits current surges due to switching polarity reversing switch 401. Resistor 450 limits the peak base current when wiper 20 of resistor 451 is adjusted to end range position 451a, closest to resistor 450. A capacitor 471 suppresses radio frequency interference (RFI) from switching transients. Resistor 453 is selected so that the maximum turn on voltage at the base of transistor Q453b is slightly less than the required 1.1 volts when the position of wiper 20 is close to an end terminal 451b of resistor 451. This eliminates a dead zone in the adjustment range. The bias at the base of transistor Q453b goes negative when resistor R457 and diode D60 conduct, but advantageously does not reach a level necessary to cause reverse conduction in the base-emitter junctions of Darlington transistor Q453.

What is claimed is:

1. A deflection apparatus with a raster positioning arrangement, comprising:
    a deflection winding;
    a deflection circuit output stage for generating a deflection current in said deflection winding;
    an inductance coupled to said deflection winding for generating an alternating current in said inductance at a frequency related to a frequency of said deflection current;
    a rectifier coupled to said inductance for conducting at least a portion of said inductance current, when said inductance current is at a first polarity; and,
    a first transistor coupled to a switching, second transistor in a Darlington configuration, said second transistor being coupled to said inductance for conducting at least a portion of said inductance current, when said inductance current is at an opposite polarity.

2. A deflection apparatus according to claim 1, further comprising a first impedance coupled in a current path of said inductance current that excludes each of said rectifier and said second transistor to develop a control voltage between a control terminal of said first transistor and one of a pair of main current conducting terminals of said second transistor.

3. A deflection apparatus according to claim 2, further comprising a second impedance coupled in series with said pair of main current conducting terminals of said second transistor to reduce a voltage developed between said pair of main current conducting terminals of said second transistor to a level that is smaller than a level of said control voltage.

4. A deflection apparatus according to claim 2, wherein said control voltage is developed from a portion of a voltage that is developed in said first impedance.

5. A deflection apparatus according to claim 1, wherein said rectifier is coupled in an anti-parallel manner with respect to said second transistor.

6. A deflection apparatus according to claim 1, wherein a difference between said inductance current portions forms a direct current component that provides for raster centering.

7. A deflection apparatus according to claim 1, wherein said inductance current is determined, in accordance with a value of said inductance.

8. A deflection apparatus with a raster positioning arrangement, comprising:

a deflection winding;

a deflection circuit output stage for generating a deflection current in said deflection winding;

an inductance coupled to said deflection winding for generating an alternating current in said inductance at a frequency related to a frequency of said deflection current;

a rectifier coupled to said inductance for conducting a first portion of said inductance current, when said inductance current is at a first polarity;

a first transistor coupled to said inductance for conducting a second portion of said inductance current, when said inductance current is at an opposite polarity, such that a difference between said inductance current at said first and opposite polarities, forms a direct current that provides for raster centering; and a first impedance coupled in a current path of said second portion of said inductance current for developing from said second portion of said inductance current a first voltage that is greater than a voltage developed between a pair of main current conducting terminals of said first transistor, said first voltage being coupled to a control terminal of said first transistor for controlling said first transistor when said first transistor conducts said second portion of said inductance current.

9. A deflection apparatus according to claim 8, further comprising a voltage divider for applying a portion of said first voltage to said control terminal of said first transistor.

10. A deflection apparatus according to claim 8, further comprising a second transistor coupled to said first transistor in a Darlington configuration.

* * * * *